United States Patent
Wykes et al.

(10) Patent No.: US 7,882,156 B2
(45) Date of Patent: Feb. 1, 2011

(54) SYSTEM AND METHOD FOR STORING ITEM ATTRIBUTES IN AN ELECTRONIC CATALOG

(75) Inventors: Nathan E. Wykes, Broomfield, CO (US); Kevin M. Brackney, Westminster, CO (US); John E. McGinn, Jr., Pittsboro, NC (US); Brian P. Doyle, Denver, CO (US); Jeff Wang, Longmont, CO (US); James D. Brown, Pine, CO (US); James D. Harman, Arvada, CO (US)

(73) Assignee: Requisite Software, Inc., Chicago, IL (US)

( * ) Notice: Subject to any disclaimer, the term of this patent is extended or adjusted under 35 U.S.C. 154(b) by 0 days.

(21) Appl. No.: 11/163,877

(22) Filed: Nov. 2, 2005

(65) Prior Publication Data

US 2007/0100842 A1    May 3, 2007

(51) Int. Cl.
G06F 7/00 (2006.01)
G06F 17/30 (2006.01)
(52) U.S. Cl. .................. 707/812; 707/948; 707/962
(58) Field of Classification Search ................. 707/100
See application file for complete search history.

(56) References Cited

U.S. PATENT DOCUMENTS

| | | | |
|---|---|---|---|
| 6,014,639 A | 1/2000 | Fohn et al. | |
| 6,023,699 A * | 2/2000 | Knoblock et al. | 707/10 |
| 6,141,655 A * | 10/2000 | Johnson et al. | 707/2 |
| 6,353,813 B1 * | 3/2002 | Breese et al. | 706/12 |
| 6,360,216 B1 * | 3/2002 | Hennessey et al. | 707/3 |
| 6,411,960 B1 * | 6/2002 | Fisher | 707/102 |
| 6,496,829 B1 * | 12/2002 | Nakamura | 1/1 |
| 6,604,107 B1 * | 8/2003 | Wang | 707/101 |
| 6,687,704 B1 * | 2/2004 | Russell | 707/100 |
| 6,728,696 B1 * | 4/2004 | Walton | 1/1 |
| 6,754,666 B1 * | 6/2004 | Brookler et al. | 707/102 |
| 6,816,175 B1 * | 11/2004 | Hamp et al. | 715/854 |
| 6,839,711 B1 | 1/2005 | Reddy et al. | 707/101 |
| 6,850,932 B2 | 2/2005 | de Judicibus | 707/3 |
| 6,868,528 B2 * | 3/2005 | Roberts | 715/853 |
| 6,871,198 B2 * | 3/2005 | Neal et al. | 707/3 |
| 6,889,226 B2 | 5/2005 | O'Neil et al. | 707/100 |
| 6,920,459 B2 | 7/2005 | Dedhia et al. | 707/102 |
| 6,944,613 B2 | 9/2005 | Lef et al. | 707/3 |
| 6,978,273 B1 * | 12/2005 | Bonneau et al. | 707/102 |
| 2001/0013036 A1 | 8/2001 | Judicibus | 707/5 |
| 2002/0087571 A1 | 7/2002 | Stapel et al. | 707/100 |

(Continued)

*Primary Examiner*—Pierre M Vital
*Assistant Examiner*—Augustine Obisesan
(74) *Attorney, Agent, or Firm*—Michael Best & Friedrich LLP

(57) ABSTRACT

An electronic catalog is provided that stores items and attributes associated with the items. One or more of the attributes may have more than one value. Items are stored in an item table with different attributes for items stored in different rows in an attribute table. Additional items may be added to a catalog by adding additional rows to the item table, with attributes related to the additional items added as rows into the attribute table. Particular attributes may have multiple values, and attributes with multiple values are associated with sub-items that correspond to different attribute trees or attribute sets associated with the item. Searching can be performed for attribute values and search results returned indicating all items and sub-items that satisfy the search criteria.

26 Claims, 8 Drawing Sheets

— 60

| DESCRIPTION | MFG NAME | MFG PART NO. | SUPPLIER NAME | SUPPLIER PART NO. | TOLERANCE |
|---|---|---|---|---|---|
| 100 OHM RESISTOR | MOTOROLA | XE5889-1000HM | VENDOR1 | MOTOR-5407 | +/- 10% |
| | | | VENDOR2 | MOT443 | |
| 100 OHM RESISTOR | TYCO | 80A5004R | VENDOR3 | TYC- - 599 | +/- 5% |
| 100 OHM RESISTOR | AMD | RO401 | VENDOR1 | AMD808 | +/- 15% |
| | | | VENDOR3 | 448AMD | |

U.S. PATENT DOCUMENTS

| | | |
|---|---|---|
| 2003/0055834 A1 | 3/2003 | Hansen et al. |
| 2003/0088566 A1* | 5/2003 | Wang ............................ 707/6 |
| 2003/0093337 A1* | 5/2003 | Song et al. .................... 705/27 |
| 2003/0110055 A1* | 6/2003 | Chau ............................. 705/1 |
| 2003/0120671 A1* | 6/2003 | Kim et al. ................... 707/100 |
| 2003/0187855 A1* | 10/2003 | Fachat et al. ............... 707/100 |
| 2003/0225778 A1* | 12/2003 | Fisher et al. ............... 707/102 |
| 2003/0236791 A1* | 12/2003 | Wilmsen et al. ............ 707/100 |
| 2004/0267762 A1* | 12/2004 | Tunning et al. ............. 707/100 |
| 2005/0071345 A1* | 3/2005 | Lin ............................. 707/100 |
| 2005/0091252 A1 | 4/2005 | Liebich et al. .............. 707/102 |
| 2005/0097187 A1 | 5/2005 | Thompson et al. .......... 709/217 |
| 2005/0192986 A1* | 9/2005 | Butler ........................ 707/100 |
| 2005/0216504 A1* | 9/2005 | Delvat et al. ........... 707/103 R |

* cited by examiner

| DESCRIPTION | MFG NAME | MFG PART NO. | SUPPLIER NAME | SUPPLIER PART NO. | TOLERANCE |
|---|---|---|---|---|---|
| 100 OHM RESISTOR | MOTOROLA | XE5889-1000HM | VENDOR1 | MOTOR-5407 | +/- 10% |
|  |  |  | VENDOR2 | MOT443 |  |
| 100 OHM RESISTOR | TYCO | 80A5004R | VENDOR3 | TYC- - 599 | +/- 5% |
| 100 OHM RESISTOR | AMD | RO401 | VENDOR1 | AMD808 | +/- 15% |
|  |  |  | VENDOR3 | 448AMD |  |

FIG.3

| CORP. PART NO. | DESCRIPTION | MFG NAME | MFG PART NO. |
|---|---|---|---|
| RES-100 | 100 OHM RESISTOR | MOTOROLA | XE5889-1000HM |
| RES-131 |  |  |  |
| RES-100 | 100 OHM RESISTOR | TYCO | 80A5004R |
| RES-148 | 100 OHM RESISTOR | AMD | RO401 |

FIG.4

| DESCRIPTION | MFG NAME | MFG PART NO. | SUPPLIER NAME | SUPPLIER PART NO. | LOCATION | PRICE |
|---|---|---|---|---|---|---|
| BALL VALVE, 3/8 INCH | ACME | 6928500 | GLOBAL VALVE | 812543 | DENVER | 109.99 US$ |
| | | | | | BERLIN | 100 EURO |
| | | | SCHROEDER | S712333 | BERLIN | 105 EURO |

| CORP. PART NO. | CORP PART NO. DESCRIPTION | DESCRIPTION | MFG NAME | MFG PART NO. |
|---|---|---|---|---|
| CPN1 | CORP PART NUM 1 | BALL VALVE, 3/8 INCH | ACME | 6928500 |
| CPN2 | CORP PART NUM 2 | | | |

Table 1

| ITEM ID | SUB ITEM ID | TREE |
|---|---|---|
| Item1 | SubItem1 | Corp Part Num Tree |
| | SubItem2 | Corp Part Num Tree |
| | SubItem3 | Supplier Info Tree |
| | SubItem4 | Supplier Info Tree |
| | SubItem5 | Supplier Info Tree |

Table 2

| ITEM ID | SUB ITEM ID | ATTRIBUTE | STRING VALUE | NUMERIC VALUE |
|---|---|---|---|---|
| Item1 | | Description | Ball Valve, 3/8 inch | |
| | | Mfg Name | ACME | |
| | | Mfg Pat Num | 6928500 | |
| | SubItem1 | Corp Part Num | CPN 1 | |
| | | Corp Part Num Desc | Corp Part Num 1 | |
| | SubItem2 | Corp Part Num | CPN 2 | |
| | | Corp Part Num Desc | Corp Part Num 2 | |
| | SubItem3 | Sup Name | Global Valve | |
| | | Sup Part Num | 812543 | |
| | | Location | Denver | |
| | | Price | USD | 109.99 |
| | SubItem4 | Sup Name | Global Valve | |
| | | Sup Part Num | 812543 | |
| | | Location | Berlin | |
| | | Price | EUR | 100 |
| | SubItem5 | Sup Name | Schroeder | |
| | | Sup Part Num | S712333 | |
| | | Location | Berlin | |
| | | Price | EUR | 105 |

Table 3

| TREE | LEVEL | ATTRIBUTE | IS KEY |
|---|---|---|---|
| Corp Part Num Tree | Level 1 | Corp Part Num | Yes |
| | | Corp Part Num Desc | |
| Supplier Info Tree | Level 1 | Sup Name | Yes |
| | | Sup Part Num | Yes |
| | Level 2 | Location | Yes |
| | | Price | |

FIG.7

TABLE 1

| ITEM | SUB-ITEM | TREE |
|---|---|---|
| 1 | 1 | CORP PN |
|  | 2 | CORP PN |
|  | 3 | SUPPLIER |
|  | 4 | SUPPLIER |
|  | 5 | SUPPLIER |

TABLE 2

| ITEM | SUB-ITEM | ATTRIBUTE ID | ATTRIBUTE NAME |
|---|---|---|---|
| 1 |  | 1 | DESCRIPTION |
|  |  | 2 | MFG NAME |
|  |  | 3 | MFG PART NO |
|  | 1 | 4 | CORP PART NO |
|  | 1 | 5 | CORP PART NO DESC |
|  | 2 | 6 | CORP PART NO |
|  | 2 | 7 | CORP PART NO DESC |
|  | 3 | 8 | SUPPLIER NAME |
|  | 3 | 9 | SUPPLIER PART NO |
|  | 3 | 10 | LOCATION |
|  | 3 | 11 | PRICE |
|  | 4 | 12 | SUPPLIER NAME |
|  | 4 | 13 | SUPPLIER PART NO |
|  | 4 | 14 | LOCATION |
|  | 4 | 15 | PRICE |
|  | 5 | 16 | SUPPLIER NAME |
|  | 5 | 17 | SUPPLIER PART NO |
|  | 5 | 18 | LOCATION |
|  | 5 | 19 | PRICE |

TABLE 3

| ATTRIBUTE ID | STRING | NUMBER | LANG |
|---|---|---|---|
| 1 | BALL VALVE, 3/8 INCH |  | EN-US |
| 2 | ACME |  | EN-US |
| 3 | 6928500 |  | EN-US |
| 4 | CPN1 |  | EN-US |
| 5 | CORP PART NUM 1 |  | EN-US |
| 6 | CPN2 |  | EN-US |
| 7 | CORP PART NUM 2 |  | EN-US |
| 8 | GLOBAL VALVE |  | EN-US |
| 9 | 812543 |  | EN-US |
| 10 | DENVER |  | EN-US |
| 11 | USD | 109.99 | EN-US |
| 12 | GLOBAL VALVE |  | EN-US |
| 13 | 812543 |  | EN-US |
| 14 | BERLIN |  | EN-US |
| 15 | EUR | 100 | EN-US |
| 16 | SCHROEDER |  | EN-US |
| 17 | S712333 |  | EN-US |
| 18 | BERLIN |  | EN-US |
| 19 | EUR | 105 | EN-US |

TABLE 4

| TREE | LEVEL | ATTRIBUTE ID |
|---|---|---|
| CORP PN | 1 | 4, 6 |
|  | 1 | 5, 7 |
| SUPPLIER | 1 | 8, 12, 16 |
|  | 1 | 9, 13, 17 |
|  | 2 | 10, 14, 18 |
|  | 2 | 11, 15, 19 |

FIG.8

TABLE 1

| ITEM | SUB-ITEM | TREE |
|---|---|---|
| 1 | 1 | CORP PN |
|  | 2 | CORP PN |
|  | 3 | SUPPLIER |
|  | 4 | SUPPLIER |
|  | 5 | SUPPLIER |
|  |  |  |
|  |  |  |

TABLE 2

| ITEM | SUB-ITEM | ATTRIBUTE VALUE ID | ATTRIBUTE NAME |
|---|---|---|---|
| 1 |  | 1 | DESCRIPTION |
|  |  | 2 | MFG NAME |
|  |  | 3 | MFG PART NO |
|  | 1 | 4 | CORP PART NO |
|  | 1 | 5 | CORP PART NO DESC |
|  | 2 | 6 | CORP PART NO |
|  | 2 | 7 | CORP PART NO DESC |
|  | 3 | 8 | SUPPLIER NAME |
|  | 3 | 9 | SUPPLIER PART NO |
|  | 3 | 10 | LOCATION |
|  | 3 | 11 | PRICE |
|  | 4 | 8 | SUPPLIER NAME |
|  | 4 | 9 | SUPPLIER PART NO |
|  | 4 | 12 | LOCATION |
|  | 4 | 13 | PRICE |
|  | 5 | 14 | SUPPLIER NAME |
|  | 5 | 15 | SUPPLIER PART NO |
|  | 5 | 12 | LOCATION |
|  | 5 | 16 | PRICE |

TABLE 3

| ATTRIBUTE VALUE ID | STRING | NUMBER | LANG |
|---|---|---|---|
| 1 | BALL VALVE, 3/8 INCH |  | EN-US |
| 2 | ACME |  | EN-US |
| 3 | 6928500 |  | EN-US |
| 4 | CPN1 |  | EN-US |
| 5 | CORP PART NUM 1 |  | EN-US |
| 6 | CPN2 |  | EN-US |
| 7 | CORP PART NUM 2 |  | EN-US |
| 8 | GLOBAL VALVE |  | EN-US |
| 9 | 812543 |  | EN-US |
| 10 | DENVER |  | EN-US |
| 11 | USD | 109.99 | EN-US |
| 12 | BERLIN |  | EN-US |
| 13 | EUR | 100 | EN-US |
| 14 | SCHROEDER |  | EN-US |
| 15 | S712333 |  | EN-US |
| 16 | EUR | 105 | EN-US |

TABLE 4

| TREE | LEVEL | ATTRIBUTE NAME |
|---|---|---|
| CORP PN | 1 | CORP PART NO |
|  | 1 | CORP PART NO DESC |
| SUPPLIER | 1 | SUPPLIER NAME |
|  | 1 | SUPPLIER PART NO |
|  | 2 | LOCATION |
|  | 2 | PRICE |

FIG.9

| DESCRIPTION | MFG NAME | MFG PART NO. | SUPPLIER NAME | SUPPLIER PART NO. | RESISTANCE | TOLERANCE |
|---|---|---|---|---|---|---|
| 100 OHM RESISTOR | MOTOROLA | XE5889-1000HM | VENDOR1 | MOTOR-5407 | 100 | +/- 10% |

SYSTEM AND METHOD FOR STORING ITEM ATTRIBUTES IN AN ELECTRONIC CATALOG

FIELD OF THE INVENTION

The present invention relates to storing, retrieving, and organizing items in database system repositories, and, more particularly, to relating multiple values of an attribute of an item in an electronic catalog.

BACKGROUND OF THE INVENTION

Searchable electronic catalogs are commonly used in support of various different electronic commerce and purchasing functions. Such catalogs may be used by an individual or company to select items to purchase from a number of items available in the catalog. Catalogs are also commonly used in enterprise applications, where several different sites within an enterprise may access a common system that may provide a catalog or catalogs of items, purchase order generation, and payment and cost tracking. These catalogs typically have an interface for selectively retrieving and providing records corresponding to items of the catalog as well as a system for electronically purchasing any items that are selected.

Many items that may be identified in such catalogs are available in a variety of different configurations and each configuration may have a unique part number and/or other identifying features associated therewith. Furthermore, different items may be available at different sites within an enterprise, available from a number of different suppliers, and/or available at different prices based on the quantity purchased. For example, a particular type of pen may be available with different colors and points, a garment may be available in different sizes, fabrics, and colors, and a power supply may be available with different input and output voltages, current capabilities, and housings. Furthermore, each of such items may be available at one of a number of locations and/or from one of a number of suppliers. Additionally, different locations may use different suppliers for a particular item, with the different suppliers having unique supplier part numbers and prices. Different locations and different suppliers often result in further added complexity, such as when different locations within a company have different corporate part numbers for an item, or when particular suppliers and/or locations use different currency. If all the part numbers, suppliers, locations, prices, and any other information for an item are each listed as separate items within a catalog, the catalog can become quite cumbersome to generate and to maintain. Furthermore, finding and selecting items from such catalogs can become quite difficult. Alternatively, if the different configurations and/or locations associated with an item are ignored for purposes of providing a relatively simple catalog, then details about the item and complete item information may be unavailable for an item. Such incomplete information can result in inefficiencies for an individual, company, and/or enterprise due to, for example, increased delivery time and/or increased cost. Furthermore, for an enterprise managing a supply chain, complete and accurate information is required for enhanced efficiency in the supply chain management. For example, if an enterprise has traditionally been ordering a particular part from two different suppliers, a volume discount may be available in the event that the part is ordered from a single supplier in larger quantities. In many events, an enterprise may also desire to avoid a single source for any particular item required in the enterprise's business to reduce the risk of supply chain disruptions. In such a case, two or more suppliers may be desired for such an item, and efficient identification and management of information related to the different suppliers may help identify such suppliers and efficiently manage and distribute orders among different suppliers.

Pens and shirts represent simple examples of products with a variety of available configurations that may be available from numerous different suppliers, prices, locations, and have various different part numbers. In some product domains, there may be thousands or even millions of different possible combinations for a particular item. A lighting fixture, for example, may be offered by different suppliers, with each supplier having different prices based on the volume of fixtures purchased. The fixture may be available at different locations, may have different corporate part numbers based on the supplier and/or location, and may have different prices based on the location. If each of the listed options has only two different values, the result is 32 possible combinations for that particular item. Such items commonly have more than two different values for each of the different options, with each option commonly having sub-options, and thus significantly more possible combinations. When represented as thousands of different items, one for each potential combination, such items become almost impossible to search, load, extract, and add to an electronic catalog. Furthermore, searching through thousands of possibilities can be very time consuming and confusing for a user.

Traditionally, many catalogs incorporating such items have been handled by coding long sequences of conditional branch instructions, typically in the form of "if, then" statements, or by defining a number of different attributes of an item and storing item data in a different table identified by a foreign key for the attribute. Such configurations, while usable, often result in a complex logic system that may be difficult to modify so as to add different products and/or locations for a particular product. In addition, such configurations are often difficult to translate across platforms to populated catalogs that operate using different software or architectures. Updates and translations are particularly important because the options of many items, such as suppliers, price, and locations, are commonly changed at relatively frequent intervals. Referring back to the particular pen example, an additional price and/or site may be added for a particular pen at any time. For the lighting fixture mentioned above, it would also be common to change configurations such as changing the available housings or finishes, that can result in changes for the item in each of the locations. As a result, such traditional systems commonly become quite complex as the number of items and are added to various catalogs.

SUMMARY OF THE INVENTION

The present invention provides an electronic catalog that stores items and attributes associated with the items. One or more of the attributes may have more than one value. Items are stored in an item table with different attributes for items stored in different rows in an attribute table. Additional items may be added to a catalog by adding additional rows to the item table, with attributes related to the additional items added as rows into the attribute table. Particular attributes may have multiple values, and such multiple value attributes are assigned to sub-items that are associated with the item. Searching can be performed for attribute values and search results returned indicating all items and sub-items that satisfy the search criteria.

More specifically, in one embodiment the present invention provides a method for storing an electronic catalog in a computer data repository. The method includes the steps of (a) storing, in a first table, data identifying at least a first item of the electronic catalog and capable of identifying at least first and second sub-items associated with the first item; (b) storing, in a second table, at least a first and a second attribute identification associated with the first item, the first and second attribute identification each identifying a property of the first item; and (c) storing at least first and second attribute values for the first attribute identification, the first and second attribute values associated with the first and second sub-items, respectively. In an embodiment, the first and second attribute identifications are stored in separate rows in the second table, and the first and second attribute values are stored in separate rows in a third table. Additional items may be added to the catalog by firstly adding a new row to the first table, the new row identifying a second item; and secondly adding at least one new row to the second table, the new row identifying a first new attribute identification associated with the second item. Additional sub-items may be added for an item by adding a new row to the table identifying a third sub-item associated with the first item; and adding a new row to the second table identifying a first new attribute identification for the third sub-item.

The electronic catalog, in one embodiment comprises a first table having a first column identifying items and a second column identifying sub-items associated with items identified in the first column; a second table having a first column identifying items, a second column identifying sub-items associated with items of the first column, and a third column identifying attribute identifications associated with items of the first column and sub-items of the second column; and a third table having a first column identifying attributes, a second column identifying string values and a third column identifying a numeric value. The third table may also include a fourth column identifying a language. The electronic catalog may also include a table storing metadata, the metadata defining at least one attribute tree that identifies a relationship between the items and the sub-items. The metadata identifies, for each sub-item, the attribute tree for the sub-item and a level within the attribute tree. In an embodiment, the metadata further identifies at least one attribute as a key attribute.

Another embodiment of the invention provides a computing system, comprising a server operable to store an electronic catalog, said electronic catalog comprising: (a) a first table storing at least a first item and at least first and second sub-items associated with the first item; (b) a second table storing at least a first attribute identification associated with the first item, the first attribute identification identifying a property of the first item; and (c) a third table storing at least first and second attribute values for the first attribute identification, the first and second attribute values associated with the first and second sub-items, respectively. The computing system, in an embodiment, is further operable to receive a search request from a user, and in response to the search request return the first item and attribute values associated with the first item. The server may receive a second search request from the user, the second search request identifying at least the first attribute identification and the first attribute value and in response thereto, searches the electronic catalog for items having the first attribute identification and an attribute value associated therewith that is equivalent to the first attribute value.

These and other features of the invention are described below.

BRIEF DESCRIPTION OF THE DRAWINGS

FIGS. 3 and 4 are tables illustrating an item and various attributes associated with the item;

FIG. 7 illustrates the storage of items and associated attributes of an embodiment of the invention;

FIG. 8 illustrates the storage of items and associated attributes of another embodiment of the invention;

FIG. 9 illustrates the storage of items and associated attributes of another embodiment of the invention;

DETAILED DESCRIPTION

The present invention recognizes that storage of items in an electronic catalog, including all relevant information for a particular item, can be a complex task. Furthermore, the storage of different options or features related to particular base items further increases this complexity. For example, if a particular component is capable of having more than one value, traditional systems typically require that a separate item be listed for each different potential value for the item. Such a system consumes significant resources and often require that individual catalog items be customized with complex joins and/or foreign keys when loaded into a catalog. The present invention provides a method and system for efficient storing of item attributes that are capable of having multiple values, and for efficient searching of the item attributes. One embodiment of the invention provides a first table that lists items and sub-items that are associated with the items. A second table identifies attributes and the items and sub-items that correspond to the attributes. A third table identifies the values of the attributes identified in the second table. Finally, metadata associated with the item defines the relationship of the items and sub-items, providing the capability for various different sub-items and also sub-items associated with other sub-items.

Figure 1:
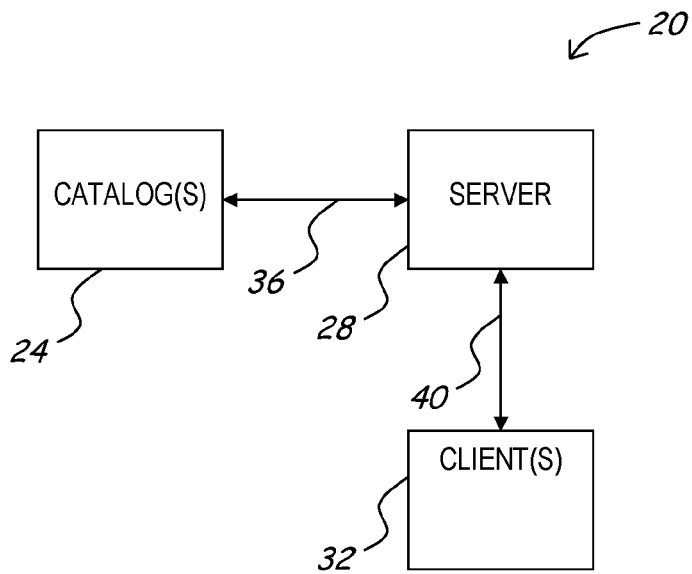
FIG. 1 is a block diagram illustration of a system of an embodiment of the present invention.

Referring to FIG. 1, a block diagram of a system of an embodiment of the invention is described. The system 20 includes one or more catalogs 24, a server 28, and one or more clients 32. The catalog 24 and server 28 are connected by connection 36, which may be any suitable connection to connect a catalog 24 and a server 28 including a local or wide area network such as the internet, an intranet, or any other appropriate connection. Similarly, the server 28 and clients 32 are connected with connection 40, which may be any local or wide area network such as the internet, or an intranet, or any other suitable connection. Furthermore, while the catalog 24, server 28, and client 32 are shown as separate components, such components may be co-located with the server, incorporated within the server, and/or or connected using any appropriate connection. Clients 32 may comprise workstations that are connected to the server 28 through the local or wide area connection 40. The client 32 workstation may include a graphical user interface such as a common internet web browser that is used to access the server. The client 32 may also include dedicated software through which the workstation communicates with the server 28 that is used in combination with, or separately from, the browser to render displays that are associated with operations performed by the server 28. A requisition function may be provided by the server 28 and/or client 24 that is used to generate a purchase order or other purchase indication that is provided to the server 28 and/or catalog.

The catalog 24 may reside in a database stored in a computer memory storage device, or may be stored in another suitable system capable of containing items associated with a catalog. Commands from the client 32, such as through web browser and/or other software, can cause information to be extracted from the catalogs 24 and provided to the client 32. The information may be provided as data that may be used by software running at the client 32, and/or in a search display or some other display requested by a user and provided by the server 28. While the invention may be implemented using browsers communicating using typical web interfaces such as HTTP (Hyper Text Transfer Protocol) and Java instructions, the present invention does not rely on any particular platform interface, and it will be understood that the invention could be implemented using any of a number of available platforms or interfaces. The invention can use web-type browser software or software that has been developed specifically for the purpose of the present invention with unique code, interfaces and display technologies. The invention can be implemented on a single machine or with any kind of distributive processing environment from mainframes with dumb terminals to wireless servers with wireless clients communicating over a wireless network.

The catalog 24 is an electronic catalog of items, such as products and/or services. In one embodiment, the catalog 24 is constructed using a uniform catalog schema so that each product or service within the catalog of items can be identified with a number of different attributes associated with the product or service. The different attributes associated with an item are capable of having more than a single value. Such attributes may include descriptive attributes of the products or services, suppliers of the products or services, locations within an enterprise of the products or services, different prices of the products or services, and/or category classifications of the products or services, to name but a few. Furthermore, the catalog 24 may include multiple catalogs, one or more catalog for each supplier for example, or an aggregated catalog in which an aggregate of product information from multiple suppliers may also be present in the catalog 24. In one embodiment, the server 28 receives data from a catalog, organizes the data, and stores the data back in the same or a different catalog using different classifications and/or data storage structures. In another embodiment, the server 28 receives data from a number of different catalogs, organizes the data, and stores the data back in the same or different catalog(s) using different classifications and/or data storage structures.

Figure 2:
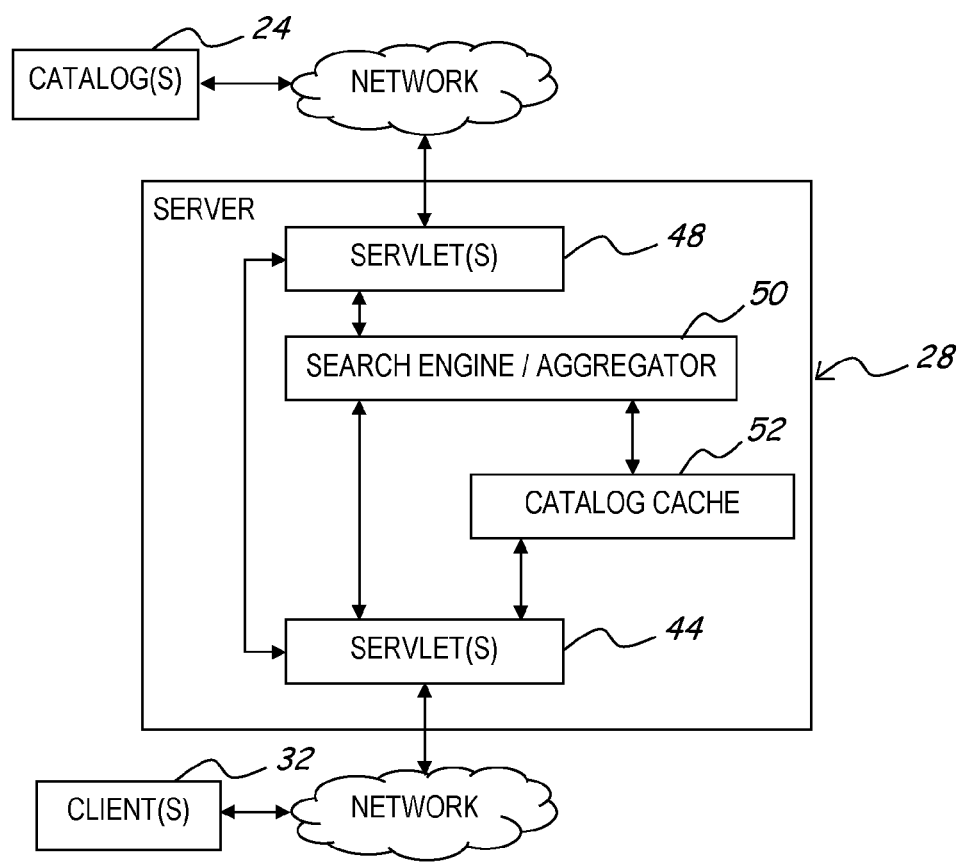
FIG. 2 is a block diagram illustration of a system of an embodiment of the invention illustrating components of a server of one embodiment of the invention.

The server 28 of an embodiment is illustrated in additional detail in FIG. 2. In this embodiment, the server 28 includes one or more servlets 48 that communicate with a search engine/aggregator 50 and provide access the one or more electronic catalogs 24. The servlets 48 may include application program interfaces (APIs) that interface with one or more electronic catalogs 24 that may be stored in one or more different databases. For example, a servlet 48 may include an API to interface with an electronic catalog stored on an ORACLE database system. Similarly, the servlets 48 may include APIs that interface with databases provided by other database providers such as SAP, IBM, and numerous others. The search engine/aggregator 50 may operate to retrieve records from one or more catalogs, to generate a separate catalog based on the contents of one or more electronic catalogs, and/or simply provide a basic search for a single electronic catalog. The search engine/aggregator 50 may be used to generate a separate catalog to be published to a marketplace, a purchaser, a seller, or within an enterprise. Furthermore, the search engine/aggregator 50 may also be used for a direct product purchase and/or for any other use of catalog records, such as system administration, management, and quality control.

The server 28 of this embodiment also includes a catalog cache 52. The catalog cache 52 may be used to store items from the one or more electronic catalogs 24 in a way that allows for more options and flexibility in searching beyond the searching that may be available using the catalogs 24 alone. For example, in an embodiment the search engine/aggregator 50 accesses the electronic catalogs 24 through servlets 48 and identifies the various items in the electronic catalogs 24. These items, and any identifying attributes, from the catalogs 24 are placed into the same or a different classification schema and stored in the catalog cache 52 in the same or a different storage structure that may be searched according to the present invention. If the same item appears in a number of different catalogs 24, the item may be listed in the catalog cache 52 with attributes identifying the different catalogs where the item appears. In one embodiment, one particular attribute, or two or more particular attributes, are selected as level 0 attributes and serve as a base identification for an item. As used herein, a level 0 attribute refers to an attribute that provides a unique description of an item. For example, an item of a catalog may have attributes that describe an operational amplifier that is manufactured by Texas Instruments and assigned a manufacturer part number TI123. The item may be available from several different suppliers. The manufacturer part number (TI123) for this particular item is common among the different suppliers, and is thus may be selected as the level 0 attribute. The information related to the different suppliers may then be selected as level 1 attributes, with the level 1 attributes capable of having values that correspond to each of the different suppliers. The item may also have additional levels of attributes, such as a case where a particular supplier has the item available at different prices and/or different locations. These attributes, for each of the suppliers, may be further identified for the item. Such multiple-value attributes will be described in more detail below.

The server 28 further includes additional servlets 44 that access the search engine/aggregator 50, the catalog cache 52, and/or servlets 48, and are connected to the one or more clients 32. In this manner, a client 32, such as a user accessing a workstation, may access the servlets 44 to provide a search for an item. The servlets 44 access the search engine/aggregator 50 that may generate a search of the catalog(s) 24 and/or catalog cache 52 to provide one or more results to the search request. The servlets 44 may also access servlets 48, and provide search parameters thereto, which are then passed to the catalog(s) that return one or more results. Furthermore, the servlets 44, 48 may be used to store and/or modify content in an electronic catalog in accordance with one or more of the storage structures and methods as described herein. The servlets 44 may include APIs that interface with various different software programs that may be operating on the client 32. Similarly as described with respect to servlets 48, such APIs may be used to interface with numerous different software applications including enterprise software applications, purchase requisition applications, supply chain management applications, to name but a few. Also, such servlets 44, 48, may be delivered to installed on the server 28 using any suitable method, such as via magnetic or optical media, and/or through a network connection, to name but a few. In this manner, the APIs may be delivered, installed, and updated as necessary.

In one embodiment in which the search engine/aggregator 50 operates as a search engine to receive search requests from client 32. The application server 28, using servlets 48, queries the one or more electronic catalogs 24 and/or catalog cache 52 through the search engine 50 and directs the results to the client 32 that initiated the search request. The type or format of the catalog may be of any suitable format so long as the catalog will respond appropriately to a query from the servlets 48 and search engine/aggregator 50. For example, a catalog 24 may reside in a relational database or may reside within an object-oriented database. In one embodiment, the catalog cache 52 includes items that are obtained from electronic catalogs 24 that reside in one or more object-oriented and/or relational databases. The electronic catalogs 24 and/or catalog cache 52 may be stored on any appropriate data storage device, including disc drives, tape drives, random access memories (RAM), read only memories such as programmable read only memories, or any other computer data storage devices or combinations thereof. The application server 28 may reside in a computer attached directly to the storage device, or alternatively may be connected to the storage device through a network. In one embodiment, the servlets 48 and 44 are based on Java APIs and Javascript/HTML interface generation. The APIs may use JDBC (Java Database Connectivity) to communicate through the search engine to a separate data store where the electronic catalogs 24 may reside. The JDBC protocol allows the search engine to communicate with one or more catalogs 24 based on a variety of commonly used databases including those available from, for example, Oracle Corp., Microsoft Corp., and SAP. Furthermore, the servlets 44 may communicate to the users and workstations associated with the clients based on a variety of commonly used software applications including those available from Oracle Corp., Microsoft Corp., and SAP, to name but a few.

In one specific embodiment, the servlets 44, 48 include APIs that are operable to communicate with a database management systems (DBMS) containing catalogs that are configured to operate with SAP Open Catalog Interface (OCI). In this embodiment, the APIs of servlets 48 format database queries and other database commands as required by the SAP Open Catalog Interface, referred to as OCI calls. The server 28 may act as an initiator of OCI calls generating such calls at servlets 48 and transmitting to one or more catalogs. The server 28 may also act as a responder to such calls, receiving a call at servlets 44 and generating a response thereto. The APIs operate to receive queries and generate commands that are transmitted to one or more of the catalogs 24. Such commands include formatting required for OCI calls initiated and transmitted to the one or more catalogs. Such an OCI call may include a URL of the particular catalog 24, parameters such as a username/password and content requests, and a return URL. For example, a user may desire to use server 28 to aggregate a number of different catalogs that are configured to respond to such OCI calls. The client 32 enters a request that is received at servlet 44, and forwarded to the search engine/aggregator 50. The search engine/aggregator 50 may operate to begin searching for items that are classified in a certain category, such as writing instruments for example, and pass a search request to servlet 48. The servlet 48 formats the search request into an OCI call and transmits the call to one or more catalogs 24. When a response is received from the catalog(s) 24, the servlet 48 returns the search results to the search engine/aggregator 50. The results may be stored in the catalog cache 52, and/or may be returned to the client 32 through servlets 44. In the event that the items in the various catalogs 24 are to be aggregated in catalog cache 52, such operations continue until the requested aggregation is complete. Similarly, in another embodiment servlets 44, 48 operate to receive a request from client 32, and format an OCI call that is transmitted to the one or more catalogs, with results received from the catalog(s) passed back to the client 32.

As mentioned, the server 28 may also operate to receive such OCI calls. In such an embodiment, the servlets 44 receive such a call and pass any requests in the call to search engine/aggregator 50 that may then generate a query for other catalogs 24 similarly as described above. Alternatively, the servlets 44 may receive such a call and access the catalog cache 52 to generate a response to the call. In one embodiment, the SRM server that is operating on the client 32 that initiates the call is configured to provide additional parameters in the OCI call that the servlets 44 may receive and perform various operations in response thereto. Additionally, one or more of the catalogs 24, and/or the catalog cache 52 may store items and related attributes in a manner that provides for enhanced and efficient item and attribute storage. Such items may have multiple value attributes that may be searched, with one or more of the item attributes having more than one value associated therewith. Such items and attribute storage will be described in more detail below. The SRM server may use the returned results in any of a number of manners, such as to create shopping cart items and to initiate and complete a purchase of items. While the catalogs 24, clients 32, and servlets 44, 48 have been described in this embodiment as interfacing using SAP systems, it will be understood that other database systems and enterprise management systems may be utilized. For example, the server 28 may interface with Oracle systems and/or IBM systems, among others.

Figure 5:
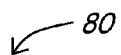
FIGS. 5 and 6 are tables illustrating another item and various attributes associated with the item.

Referring now to FIGS. 3-5, the storage of various items having multiple item attributes in a catalog is described for an embodiment of the invention. Referring first to FIG. 3, a table 60 containing several items from one or more catalogs is illustrated. The items in this example are 100 Ohm Resistors. Such items are available in several different catalogs and may be available from several different suppliers and manufacturers. For example, two suppliers, vendor1 and vendor2 in this example provide 100 Ohm resistors that are manufactured by Motorola and are assigned by Motorola to have part number XE5889-100 Ohm. While the two suppliers provide this item, each supplier typically has a different supplier part number, a different price, different units of measure (UOM) for ordering the item, etc. In certain cases, it may be desired to display the various different items in a single table 60 as illustrated in FIG. 4. Such an illustration of items may be useful for an enterprise that is seeking to reduce the number of suppliers of an item, or that is seeking to purchase from a supplier that has a lower price for the item, for example. In such a case, an enterprise may determine that such items are being purchased from several different suppliers. Such a situation may occur for a variety of reasons, such as different sites within the enterprise using local suppliers that are local to the site, previous relationships with different suppliers, different suppliers based on previous catalogs that may have been used by various personnel within the enterprise, and acquisition of a firm that previously used different suppliers, to name but a few. In such a situation, the total number of items ordered from the different suppliers may cumulatively result in a significant volume of the item that is purchased by the enterprise, and a volume discount may be negotiated with a supplier based on such volume purchases. An enterprise may desire, also, to increase the number of suppliers for a particular item. Such a situation may occur for a variety of reasons, such as reducing the risk of supply disruptions for items that are purchased from a single supplier, diversifying the base of suppliers for supply chain efficiency, and purchasing items from suppliers that are local to a particular site, to name but a few.

The items are described by a plurality of different attributes, and one or more of the attributes may also have multiple different values. For example, the attributes associated with such items may include a description, manufacturer name, manufacturer part number, supplier name, supplier part number, and tolerance. In this example, three different manufacturers supply a 100 Ohm Resistor, namely, as illustrated, Motorola, Tyco, and AMD. Each of the manufacturers has a manufacturer part number for the item that are listed as attributes under the column headed 'Manufacturer Part Number'. Further, in this example, several different suppliers supply the items, and in two cases in this example two or more vendors provide the same item. For example, both Vendor1 and Vendor2 provide the Motorola 100 Ohm Resistor. Accordingly, under the column headed 'Supplier Name' the vendors are listed. This provides a single attribute, namely 'Supplier Name' that has two different values. Similarly, both Vendor1 and Vendor3 supply the AMD item, and thus the Supplier Name attribute for this item has the values of both Vendor1 and Vendor3. Traditionally, the storage and searching and retrieval of items having multiple attribute values for a single descriptive attribute is a relatively complex task. For example, catalogs may include items as a single row in a catalog database. The database includes a table including numerous different items with the particular item occupying a single row within the table and the various columns of the table including attributes of the item. In the event that an item has an attribute that may have more than one value, complex linking tables and/or additional columns that have complex linking attributes are provided to account for such a situation.

Further adding to the complexity, an enterprise or business often provides a corporate part number for various items. Such an example is illustrated in FIG. 4. In FIG. 4, a table 80 illustrates the various items corresponding to a 100 Ohm Resistor along with an additional 'Corp. Part No.' attribute listed in a separate column. In this example, the Motorola item corresponding to the 100 Ohm Resistor is assigned to two different corporate part numbers illustrated under 'Corp. Part No.' in FIG. 4. Thus, a single attribute for the item, corporate part number, has two different values. The present invention provides a system and method for storing such attributes having multiple values in different database tables that do not require complex additional linking or foreign keys, or the addition of multiple columns to a particular table, the columns corresponding to an attribute that is described in another column of the table. In one embodiment of the present invention, the one or more attributes for a particular item is selected to be level 0 attributes, and such attributes may only have a single value. In this example the manufacturer name and manufacturer part number attributes are level 0 attributes. The manufacturer name and manufacturer part number attributes are restricted to a single value because these attributes uniquely describe this particular item. That is, regardless of different various descriptions, corporate part numbers, and supplier part numbers that may be assigned to the item, the manufacturer name and part numbers will not change.

The particular attributes that are selected to be level 0 attributes depend upon the particular item that is stored in the catalog. For example, an item that is manufactured by a number of different manufacturers and is freely interchangeable regardless of the manufacturer may have a different attribute, or attributes, selected as level 0 attributes. Such an item may be, for example, paper clips, where a user of the item has no preference regarding a particular source or manufacturer of the paper clip. In this case, attributes describing the paper clip, such as size and material, may be selected as level 0 attributes, and manufacturer name and manufacturer part number may be selected as level 1 (or higher) attributes that are capable of having multiple values. The selection of the attributes that are used as level 0 attributes is based upon the application in which the catalog is to be used. In one embodiment, a system administrator may review items in the catalog and identify the attributes that are to be level 0 attributes, and attributes that are to be level 1 (or higher) attributes, as well as the relationship between different attributes. In one embodiment, related attributes are placed in attribute trees for an item, such as a supplier attribute tree in which all of the attributes in the particular tree are related to different suppliers of items in the catalog. The selection and relationship of attributes, and different attribute trees for items, will be described in more detail below.

Other attributes designated as level 1 or higher, as mentioned, may have more than one value. For example, in FIGS. 3 and 4, the supplier name and supplier part numbers are allowed to have multiple values, and are thus multiple value attributes. Thus, for each unique part, identified by manufacturer name and manufacturer part number, the two or more different suppliers that may supply that particular item may be associated with the item and also associated with a single attribute of the item. Furthermore, additional supplier-specific information may be included, such as price, with the supplier-specific information assigned to an attribute that may have multiple different values. Additionally, the corporate part number may also have multiple different values associated with the particular item provided by the manufacturer. This allows the linking of several unique manufactured items using one corporate part number attribute. In this example, corporate part number RES-100 corresponds to two different unique manufactured items, namely 100 Ohm Resistors supplied by both Motorola and Tyco. Accordingly, the unique items supplied by Motorola and Tyco both may be provided when a request for corporate part number RES-100 is requested. Furthermore, a particular item may have more than one corporate part number, depending upon different uses. For example, corporate part number RES-100 may be associated with a 100 Ohm Resistor having a tolerance of 10% or less regardless of the manufacturer of the part. In this example, the Tyco and Motorola resistors meet such a requirement, but the AMD resistor does not. Accordingly, the Motorola and Tyco resistors are assigned corporate part number RES-100 while the AMD product is not. In other situations, a corporation may simply have duplicate corporate part numbers for a particular item. For example, a corporation may have two different divisions that use the Motorola item, but assign a different corporate part number to the item. In this example, the Motorola item corresponds to corporate part numbers RES-100 and RES-131. Such a situation may occur, for example, when different divisions or locations within the corporation assign part numbers independently from other divisions or locations. Such a situation may also occur, for example, as a result of a merger or acquisition. In one embodiment, the present invention is operable to identify such occurrences and flag instances where unique items are assigned multiple part numbers within a corporation. A system administrator or other user may take action to eliminate such a duplicate part number in order, for example, to enhance efficiency of procuring such items.

Figure 6:
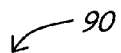

Furthermore, other examples exist in which a single supplier may have an item available in multiple locations. In such a situation, a single attribute, namely location, may have multiple different values. Thus, in some cases, multiple suppliers may provide a particular item, and one or more of the suppliers may have the item available in multiple locations. Furthermore, similarly as described above, the item may have multiple corporate part numbers. Such an item may be considered as having two attribute trees. A first attribute tree includes the corporate part number information, and the second attribute tree includes supplier information. The second attribute tree would further have two levels, a first level for a particular supplier and a second level for locations at which the supplier has the item available. An example of such an item is illustrated in FIGS. 5-6. The item in this example is a ⅜ inch ball valve manufactured by Acme. The item has two different corporate part numbers (the first attribute tree) assigned to it, and the item is supplied by two different suppliers at two different locations (the second attribute tree with two levels). FIG. 5 illustrates the item along with the different suppliers and different locations at which the item is available from each supplier in table 80. FIG. 6 illustrates the item along with the different corporate part numbers associated with the item in table 90.

The present invention provides for the storage, searching, and retrieval of items having a number of attributes, with one or more of the attributes having more than one value. Such items, associated attributes, and attribute values are stored, in one embodiment, in multiple tables, each of the tables having a number of columns and rows, with different attributes for an item stored in a single column of a table and the values for the attributes stored in a single column of a table. The items may have attribute trees, with different trees describing different information for an item. The relationship between an item, the item attributes, and the different attribute trees that an item attribute may be associated with, is defined by metadata for the item. By way of example, the storage of such attributes for an embodiment is described with reference to the items of FIGS. 5 and 6. The item, attributes, and attribute values are illustrated in three different tables in FIG. 7. Table 1 includes three columns, a column for Item ID, a Sub-Item ID column, and a Tree column. The Item ID column contains a unique identification of the item. In this example, the item is identified as Item1. Item1, in this example, includes five different sub-items. The Tree column identifies the attribute tree that the particular sub-item is associated with. In this example, SubItem1 and SubItem2 are associated with the corporate part number tree, and SubItem3 through SubItem5 are associated with supplier information tree.

Still referring to FIG. 7, Table 2 illustrates the storage of items and associated attribute identifications along with attribute values. In this embodiment, a first column, Item ID, includes the item identification, Item1 in this example. The second column, Sub Item ID, includes sub-item identification for the different sub-items. The third column, Attribute, includes attribute identifications for the various attributes associated with the item. The fourth column, String Value, includes attribute values that are strings of characters. Finally, the fifth column, Numeric Value, includes attribute values that are numeric. In cases where an attribute does not have a numeric value, the Numeric Value column for that attribute is empty. In some cases, an attribute may have both a string value and a numeric value, in which case both the String Value and Numeric Value columns will have a value. In the example if FIG. 7, the Price attribute has both numeric and string values. In this case, the attribute value in the String Value column is a unit of currency, and the attribute value in the Numeric Value column is the number associated with the price. Thus, SubItem3 has a price of 109.99 U.S. dollars, while SubItem4 has a price of 100 Euros. The relationship of the attribute trees in the example of FIG. 7 is indicated in Table 3. Table 3 includes a first column, Tree, that indicates the tree to which the various attributes belong. The second column, Level, indicates the level of the attributes and the third column, Attribute, identifies the attributes. In this example, the CorpPartNum Tree has two level 1 attributes, namely CorpPartNum, and CorpPartNumDesc. The SupplierInfo Tree includes two Level 1 attributes and two Level 2 attributes. In this manner, the relationship of the attributes to the item is established. Table 3 also includes a fourth column, IsKey, that indicates whether the particular attribute is a key attribute.

As illustrated in FIG. 7, an item may have a number of different sub-items that are placed in different attribute trees. Each of the attribute trees are independent of other attribute trees, although in some embodiments attributes contained in one attribute tree may also be included in a different attribute tree for the item. For example, a corporate part number tree for an item may include an attribute describing a supplier name that has values corresponding thereto identifying one or more suppliers for the part described by the corporate part number. A supplier information attribute tree that is separate from the corporate part number tree may also include an attribute describing a supplier name. While the supplier name attribute is contained in each of the example attribute trees, the different attribute trees are independent of each other, and typically contain information that is relevant to the particular attribute tree. Furthermore, an individual item may have any number of different attribute trees, corresponding to different groupings of information related to an item that may be useful to an organization or even a particular user. Thus, the data structure described for storing information related to an item in attribute trees may be thought of as storing information in multiple different dimensions, one dimension for each attribute tree. As will be appreciated, the number of different individual combinations of attributes corresponding to an item can become a relatively large number that may be computed as the product of the number of end points of each attribute tree. With reference to the ⅜ inch ball valve example, there are two attribute trees. The corporate part number attribute tree has two end points, namely the different corporate part numbers associated with the item. The supplier information attribute tree has three endpoints, namely two suppliers with one supplier having the item available in two different locations. Thus, the total number of possible combinations of attributes describing the item is six. Specifically, for each corporate part number, there are three possible combinations of suppliers/locations. In many cases, an item may have additional attribute trees, such as an attribute tree describing physical attributes of a part. In the example of the ⅜ inch ball valve, the item may be made of brass, and have threaded end fittings. In such a case, the item may have an attribute tree containing the different physical attributes. In the event that any attributes within the additional attribute tree have more than one value, the number of possible combinations of attributes would be multiplied by the number of endpoints of the additional attribute tree(s).

While illustrated in three different tables in FIG. 7, it will be understood that the structures used to store the information related to various items may take numerous different forms. For example, rather than including information related to an item in three tables, additional, or fewer, tables may be utilized containing different portions of the information associated with items. The selection of storage structures is dependent upon several factors, such as the searching that is contemplated to be performed on the items, the views that are expected to be requested and the information to be provided in the different views that may require joining of various tables or display of items and attributes in particular formats. Furthermore, while data describing various different attributes of items is described as being stored in tables, with several examples provided herein, it will be understood that such tables are conceptual, and can have different physical realizations that may be attained by common database design techniques, such as normalization, among others. It is contemplated that the concepts described herein may be implemented in various other embodiments that may have other equivalent physical realizations.

In one embodiment of the present invention, items and sub-items, attribute identification, attribute values, and metadata are each stored in a separate table. Referring now to FIG. 8, the storage of various items within various tables this embodiment are described. The tables include rows associated with a particular item and various sub-items that may be associated with the item. In this embodiment, a sub-item may be an item which has more than one value for a particular attribute. Furthermore, different sub-items may further have different attributes which may have two or more values associated therewith. Thus, an item may have a sub-item with the sub-item having two or more additional sub-items and so on. In one embodiment an item has one or more attributes that are referred to as Level 0 attributes that have only a single value associated with such attributes. The sub-items have attributes that are Level 1 attributes, and may have two or more values associated with such attributes. Further, an item may have several attributes that are referred to as Level 1 attributes, thus allowing several different attributes of an item to have more than one value. In the examples of FIGS. 5 and 6, the corporate part number and vendor name attributes are both Level 1 attributes, and location is a Level 2 attribute within the supplier information tree. Referring again to FIG. 8, the items and attributes are stored in four different tables to provide the capability of having multiple attributes that may have multiple different values without the requirement of complex foreign keys or the addition of columns to a table. The tables include Table 1 that has three columns, a first column for an item, a second column for a sub-item, and a third column for an attribute tree. In the example illustrated in FIG. 8, the first item, Item 1, has five sub-items associated therewith, listed as Sub-Items Nos. 1-5 respectively in the sub-item column. Additional items may be added to the table by simply adding additional rows to the table indicating items and associated sub items. Continuing with the example of FIGS. 5 and 6, Item 1 corresponds to the ACME ⅜ Inch Ball Valve, with Sub-Items 1 and 2 corresponding to the different corporate part number attributes associated with the item. Sub-Items 3-5 correspond to the different supplier and location attributes associated with the item. The corresponding attributes and attribute values associated with the different items and sub-items are listed in Table 2 and Table 3, with the metadata defining the relationship between the items and sub-items contained in Table 4.

Referring now to Table 2 of FIG. 8, the table includes four columns: an item column, a sub-item column, an attribute identification column, and an attribute name column. Each item may have a number of different attribute identifications associated therewith. Furthermore, each sub-item may have one or more attribute identifications associated therewith. In this example, the first item, Item 1, has nineteen attribute identifications, namely Attribute ID Nos. 1-19. Attribute ID Nos. 1-3 are not associated with any particular sub-item associated with Item 1, and thus the sub-item column for these attribute identifications is empty. Attribute ID Nos. 4-19 do have a sub-item associated therewith, as indicated in the sub-item column. In this example, Attribute ID No. 1 is the manufacturer description, Attribute ID No. 2 is the manufacturer name, and Attribute ID No. 3 is the manufacturer part number. As each of these attributes is associated with a device provided by a particular manufacturer, they do not have multiple values associated therewith and thus are associated with Level 0 attributes, indicated by the lack of a sub-item associated with these attributes. Sub-Item 1 associated with Item 1 has two attribute IDs associated therewith, namely Attribute ID Nos. 4 and 5. In this example, Attribute ID No. 4 is the corporate part number and Attribute Id. No. 5 is the corporate part number description. Sub-Item 2 of Item 1 also has two attribute identifications associated therewith, namely Attribute ID Nos. 6 and 7 corresponding to the corporate part number and corporate part number description for the second sub-item. Sub-Items 3 through 5 each have four attribute identifications associated therewith, with each sub-item having an attribute identification for the supplier name, supplier part number, location, and price.

Referring now to Table 3 of FIG. 8, the attribute values are stored in this table. Table 3 includes four columns: an attribute identification column, a string value column, a numeric value column, and a language value column. Each of the columns may contain values associated with the attribute identifications. Thus, each attribute identification has a value which is stored in Table 3. The value for a particular attribute may be one or more of a string value, a numeric value, and a language value. Referring still to the example of FIGS. 5 and 6, and as mentioned above with respect to Tables 1 and 2, Item 1 is associated with the ACME ⅜ inch ball valve, and has Sub-Items 1-5 associated therewith, and also has Attribute ID Nos. 1-19 associated therewith. As illustrated in Table 3, Attribute ID No. 1 has a string value that says 'Ball Valve ⅜ Inch', Attribute ID No. 2 has a string value that is 'ACME' corresponding to the manufacturer name, and Attribute ID No. 3 has a string value that is '6928500' corresponding to the manufacturer part number. For these attributes, the numeric value column is empty as these particular attributes do not have a numeric value associated therewith. While the Attribute ID. No. 3 is the manufacturer part number, and contains numeric digits, in this embodiment this attribute value is still placed in the string value column to provide uniform searching if a search is performed based on the part number, as part numbers commonly contain characters that are not numbers. Finally, the language attribute of these attributes is US English. As will be understood, the language of a particular attribute may be any of a number of different languages, and the language is recorded in the language attribute column. Furthermore, in the event that a particular item has attributes that are in more than one language, such attributes may be assigned to an attribute tree and to a level within the tree so as to provide multiple values, one value for each language, for the particular attribute(s) that have more than one language. Attribute ID Nos. 4-19 correspond to the attribute names described above with respect to Table 2 that are associated with the various items and sub-items of FIGS. 5 and 6.

Finally, with reference to Table 4, metadata associated with each of the attribute trees is listed. In this example, the corporate part number attribute tree has two attributes which are all Level 1 attributes. The supplier information attribute tree has four attributes, two of which are Level 1 attributes and two of which are Level 2 attributes. The attribute identifications associated with each of the attributes are listed in Attribute ID column 168.

Referring now to FIG. 9, the storage of various items within various tables of another embodiment is described. Continuing with the example of the ⅜" ball valve manufactured by Acme, this embodiment includes an attribute value identification that may be used to store attribute values and thus reduce duplicative entries of different attribute values. The tables, similarly as described above, include rows associated with a particular item and various sub-items that may be associated with the item. Similarly as described above, the sub-items may have more than one value for a particular attribute, and different sub-items may further have different attributes that may have two or more values associated therewith, thus resulting in an item that may have a sub-item with the sub-item having two or more additional sub-items and so on. In the embodiment of FIG. 9, the items and attributes are stored in four different tables. The tables include Table 1 that has three columns and is similar to Table 1 as described in the embodiment of FIG. 8. Particularly, Table 1 includes a first column for items, a second column for sub-items, and a third column for an attribute tree. As described above, the first item, item 1, has five sub-items associated therewith.

Referring now to Table 2, the table includes four columns: an item column, a sub-item column, an attribute value ID column, and an attribute name column. Each item may have a number of different attribute identification values associated therewith. Furthermore, each sub-item may have one or more attribute value identifications associated therewith. In this example, the first item, item 1, has sixteen attribute value identifications, namely attribute value ID nos. 1-16. Attribute value ID nos. 1-3 are not associated with any particular sub-item associated with item 1, and thus the sub-item column for these attribute value identifications is empty. This also indicates that these attribute are level 0 attributes. Attribute value identification nos. 4-16 do have a sub-item associated therewith, as indicated in the sub-item column. In this example, attribute value ID no. 1 is the manufacturer description, attribute value ID no. 2 is the manufacture name, and attribute value ID no. 3 is the manufacturer part no. Sub-item 1 associated with item 1 has two attribute value IDs associated therewith, namely attribute value ID nos. 4 and 5. In this example, attribute value ID no. 4 is the corporate part number and attribute value ID no. 5 is the corporate part number description. Sub-item 2 of item 1 also has two attribute value identifications associated therewith, namely attribute value ID nos. 6 and 7 corresponding to the corporate part number and corporate part number description for the second sub-item. Sub-items 3-5 each have four attribute value identifications associated therewith, with each sub-item having an attribute value identification for the supplier name, supplier part number, location, and price. In this embodiment, attribute value identifications 8, 9, and 12 are duplicated for three of the sub-items, indicating that each of these sub-items has attribute values that are duplicate. These particular attribute values correspond, in this example, to the supplier global valve, the global valve supplier part no. 812543, and the location of Berlin. Because these particular attributes have the same values, duplicate rows in the attribute value table, Table 3, may be avoided.

Referring now to Table 3 of FIG. 9, the attribute values are stored in this table. Table 3 includes four columns, namely an attribute value identification column containing the attribute value identifications, a string value column containing string values associated with the attribute value identifications, a numeric attribute column containing numeric attributes associated with the attribute value identifications, and language column containing language values associated with the attribute value identifications. Thus, each attribute value identification has a value which is stored in Table 3. The attribute values stored in Table 3 of FIG. 9 are similar to the attribute values stored in Table 3 of FIG. 8, with attributes that have duplicate values eliminated. In this example, Table 3 of FIG. 8 includes three attributes which have identical values. Namely, Attribute ID nos. 8 and 12 both correspond to the attribute value 'Global Valve'; Attribute ID nos. 9 and 13 both correspond to the attribute value '812543'; and Attribute ID nos. 14 and 18 both correspond to the attribute value 'Berlin'. In the embodiment of FIG. 9, these attribute values are stored in a single attribute value identification, with the attribute value identification duplicated in Table 2. Thus, the number of attribute values stored in Table 3 may be reduced. In the event that the catalog contains numerous different items which have duplicative attribute values, such an embodiment may result in significant storage savings within the database storing the different tables.

Finally, with reference to Table 4 of FIG. 9, metadata associated with each of the attribute trees is listed. In this example, the corporate part number attribute tree has two attributes which are level 1 attributes. The supplier information attribute tree has four attributes, two of which are level 1 attributes and two of which are level 2 attributes. The attribute names associated with each of the attributes are listed in the attribute name column.

While the storage of information related to items of a catalog has been described with respect to several different embodiments, it will be understood that numerous other options exist for the storage of such information. For example, in the embodiments of FIGS. 8 and 9, several attributes are listed as having separate attribute identifications while these attributes describe the same information for the particular item and sub-item. Such an example is with attribute identification numbers 11, 15, and 19, each describing a price for the item. It is contemplated that a description for such an attribute may be stored in a separate table, with attribute identifications, or attribute value identifications, having corresponding information indicating that the attribute name is stored in such a separate table. In this manner, the amount of physical storage required to store such tables is reduced as the same identification is not placed in tables a large number of times.

Catalogs employing the item storage as described may be used in many different applications. Searching for items within such a catalog of an embodiment of the present invention is now described. When a search is performed, the results of the search are displayed to the user or otherwise provided to the client in a format that the client may use. The attributes and attribute values displayed may be the attributes associated with any of the attribute trees defined for the item. In one embodiment, a default attribute tree is displayed that is associated with the first attribute tree that is listed in the metadata, with a drop down box available for the user to select a different attribute tree to view. In such a manner, a user may view only the attributes that are of interest to the user. In one embodiment, the attribute tree that a user views most often is set to the default attribute tree, with a drop down box available for the user to select a different attribute tree. The display of different attribute trees, in an embodiment, is in a table format similar to those illustrated in FIGS. 3-6.

In one embodiment, an electronic catalog may be searched for items that have one or more equivalent attributes to a selected item. Such a search may have a number of uses. For example, a designer may desire to have a particular part included in a design, only to find that the particular part is not readily available. The designer may desire to find a part that is functionally equivalent to the desired part that is more readily available. Another use of such a search may be for a temporary replacement part in a high volume production operation. Such an operation may have a piece of equipment suffer a failure of a particular component, and thus become unable to operate. Such a halt in operation can result in significant revenue loss, and it is beneficial to bring the equipment back up and running in as short a time as possible. In the event that a replacement part is not readily available, an equivalent component may be searched and, if available, used to bring such equipment back up. Still another use of such a search is for a company or enterprise that desires to reduce the number of parts that are used in the company or enterprise. Such a reduction in parts may have a number of benefits, such as a reduced amount of inventory, increased volume purchases for remaining parts that may result in volume discounts, standardized designs, among others.

Figures 10, 11:
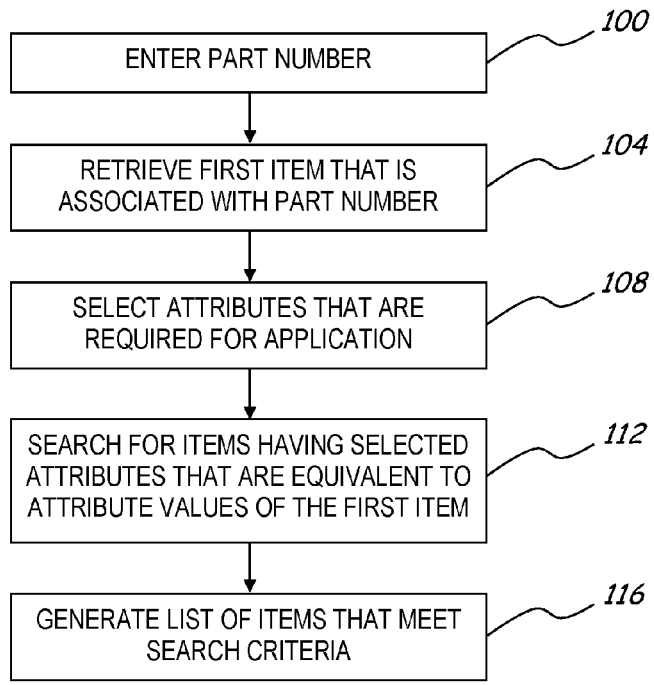
FIG. 10 is a flow chart illustration of the operational steps for searching of an embodiment of the invention.
FIG. 11 is a record associated with an item searched.

Referring now to FIG. 10, the operational steps for an equivalency search for an embodiment of the invention are now described. Initially, as indicated at block 100, a part number is entered into a search interface. A user may select the part number in any of a number of ways, such as a designer entering the part number of a particular item that is desired to be used in a particular design. For example, referring again to the example of FIGS. 3 and 4, a designer may enter the manufacturer part number for the Motorola 100 Ohm resistor. A search is performed of the electronic catalog, as noted at block 104, and a first item is retrieved that is associated with the part number. In the example of the Motorola 100 Ohm resistor, the attributes associated with the resistor are retrieved and displayed to the user, illustrated in FIG. 11. Alternatively, a user may conduct a search based on other criteria that does not include a part number, and select an item that is displayed in a set of search results.

As mentioned above, a particular item may have a number of different attribute trees associated therewith, and the attributes that are displayed as a result of a particular search may be determined based on the requirements of the user. In one embodiment, there are attribute trees associated with physical item characteristics, suppliers of the item, and corporate information for the item. The attributes selected to be displayed may be different based on the user. For example, an engineer searching for an equivalent part may not be interested in the suppliers or corporate information related to the item, and is interested only in the physical item characteristics, such as the material or particular electrical rating of a part. Alternatively, a procurement specialist for the company may not be interested in physical item characteristics or corporate information, and is interested only in alternate suppliers and pricing associated with the suppliers. In one embodiment of the invention, a user may select the attributes that are to be displayed in a first search, with these attributes then selected as default attributed in future searches for that particular user. Thus, following the selection of physical item characteristics in a first search, an engineer searching for items will view physical item characteristics by default in future searches, unless other attributes are selected. In another embodiment, the results displayed include a drop down list indicating the different attribute trees for the item. A different attribute tree may be selected by the user to display the attributes contained in that tree.

Referring again to FIG. 10, at block 108 attributes that are required for a particular application are selected. In the example of FIG. 11, a user may select the tolerance attribute. Such a selection may be the result of knowledge that the particular component, in this example a designer may desire a 100 Ohm resistor that has a certain tolerance required for a particular device to operate properly. Thus, in this example, the tolerance attribute would be selected along with the attribute for the amount of resistance, 100 Ohms. At block 112, a search is performed for items having selected attributes that are equivalent to attribute values of the selected attribute(s) of block 108. In the example of FIG. 11, a search would be performed for items that are 100 Ohm resistors that have a tolerance of 10%. In another embodiment, the search for equivalent attributes may include a search for a range of attribute values. For example, in FIG. 11 a tolerance of less than 10% may be selected for the search. In such a case, all 100 Ohm resistors having a tolerance of 10% or less would searched for. Finally, at block 116, a list of items that meet the search criteria is generated. A user may view the list and select one or more items from the list and, for example, initiate a procurement of the item(s). In one embodiment, the system interacts with a procurement system to submit an order for one or more items.

Figure 12:
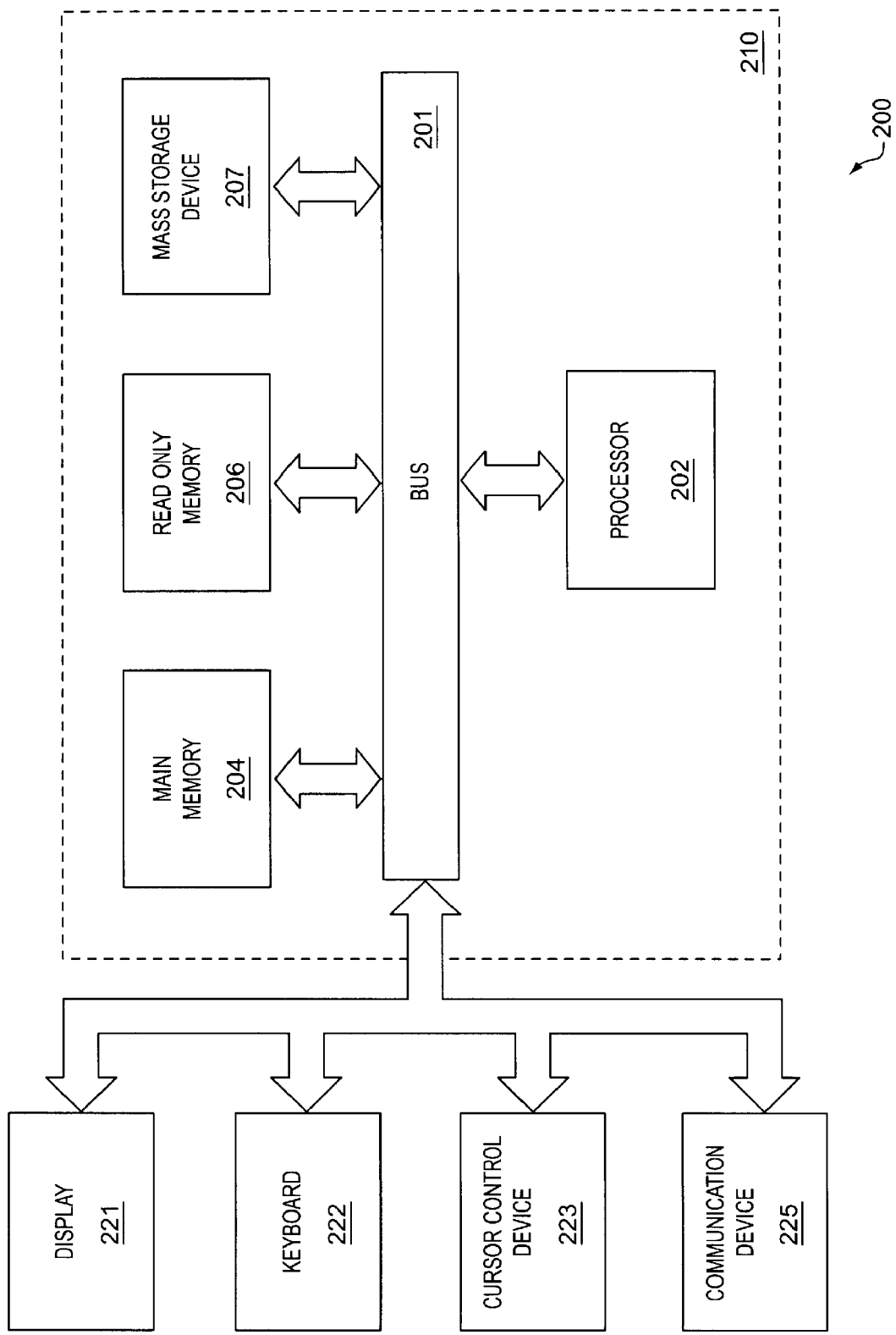
FIG. 12 is a block diagram illustration of a computer system of an embodiment of the invention.

A computer system 200 representing an example of a system upon which features of the present invention may be implemented is illustrated in FIG. 12. The different items illustrated in FIGS. 1 and 2 can be configured similarly to what is illustrated in FIG. 12, although, as will be understood, numerous other configurations are possible. Each of these components may be provided using its own computer system or several different components can be combined. For example, the search engine, server, applets, and catalogs can all be provided using a single computer system. Similarly, such components may be provided using a distributed computer system. The computer system can be deployed on a single platform as illustrated or different components can be provided on separate platforms so the bus 201 connects several different platforms together containing different portions or aspects of the mass storage 207 and other systems 210 components. The computer system may also be implemented in one or more small portable platforms such as laptops and/or desktop computers. The system 200 includes a bus or other communication device 201 for communicating information, and a processing component such as a microprocessor 202 coupled with the bus 201 for processing information. The computer system 200 further includes a main memory 204 such as a random access memory (RAM) or other dynamic data storage device coupled to the bus 201 for storing information and instructions to be executed by the processor 202. The main memory also may be used for storing temporary variables and/or other intermediate information generated during execution of instructions by the processor.

The computer system may also include a non-volatile memory 206 such as a read only memory (ROM) or other static data storage device coupled to the bus for storing static information and instructions for the processor. A mass memory 207 such as a pneumatic disk or optical disk and its corresponding drive may also be coupled to the bus of the computer system and operate to store information and instructions such as the various databases.

The computer system may also be coupled via the bus to a display device or monitor 221, such as a CRT, LCD, or other type of display, for displaying information to a user. For example, graphical and textural indications of the status of various instructions and/or operations and other information may be presented to a user on the display device. Typically, an alphanumeric input device 222, such as a keyboard, may be coupled to the bus for communicating information and command selections to the processor. A cursor control device 223, such as a mouse, trackball, touch screen, or other cursor direction keys may be coupled to the bus for communicating direction information and command selections to the processor and to control cursor movement on the display 221.

A communication device 225 is also coupled to the bus 201. The communication device 225 may include a modem, a network interface card, a wireless communication device, or any other well-known interface device such as those used for coupling to internet, token ring, or other types of physical attachment for purposes of providing a communication link to support a local or wide area network (LAN or WAN), for example. In this manner, the computer system may also be coupled to a number of clients or servers via a conventional network infrastructure including an internet or the intranet, for example. Source content and the databases can be made available to the computer system over such a network infrastructure.

As will be appreciated, the computer system 200 described is for purposes of discussion and illustration only, and the functions of the system of the present invention may be implemented on any appropriate computing system and computing platform. Therefore, the configuration of the exemplary computer system 200 will vary from implementation to implementation depending on numerous factors such as price constraints, performance requirements, technological improvements, and/or other circumstances.

While the invention has been particularly shown and described with reference to various embodiments thereof, it will be understood by those skilled in the art that various other changes in the form and details may be made without departing from the spirit and scope of the invention.

What is claimed is:

1. A computer-implemented method for storing data in a computer data repository, the data identifying a particular item in an electronic catalog that is described by a set of attributes including at least one attribute that has at least two alternative values used to describe the same particular item, comprising the steps of:
   storing in a first table data identifying at least a first item and at least first and second sub-items associated with said first item, said first item being an item in an electronic catalog and said first and second sub-items corresponding to alternative information for the same attributes of said first item;
   storing in a single attribute identification column of a second table at least a first and a second attribute identification associated with said first item, said first attribute identification identifying a first property of both said first and second sub-items and being repeated for each of said first and second sub-items in respective rows of the single attribute identification column, and said second attribute identification identifying a second property of both said first and second sub-items; and
   storing at least a first and a second attribute values for said first attribute identification in respective rows of an attribute value column within one of the second table and a third table, said first and second attribute values associated with said first and second sub-items, respectively, and being alternative values of said first property identified by said first attribute identification for said first and second sub-items respectively;
   wherein the first and second attribute identifications are unique identifiers and said steps of storing do not make use of a foreign key.

2. The method of claim 1, wherein said first and second attribute identifications are stored in separate rows in said second table.

3. The method of claim 1, wherein said attribute value column is in the third table.

4. The method of claim 1, further comprising:
   firstly adding a second item to said first table; and
   secondly adding, in response to said firstly adding, at least one new attribute identification to said second table, said new attribute identification associated with said second item.

5. The method of claim 1, further comprising:
   adding a third sub-item to said first table, said third sub-item associated with said first item;
   adding a first new attribute identification to said second table for said third sub-item; and
   adding at least one new attribute value associated with the first new attribute identification.

6. The method of claim 1, wherein said first table comprises:
   a first column identifying items;
   a second column identifying sub-items associated with items identified in said first column; and
   a third column identifying an attribute tree associated with each sub-item.

7. The method of claim 6, wherein said second table comprises:
   a first column identifying items;
   a second column identifying sub-items associated with items of said first column; and
   the attribute identification column identifying attribute identifications associated with items of said first column and sub-items of said second column.

8. The method of claim 7, wherein a third table comprises:
   a first column identifying attributes;
   a second column identifying string values when said attributes have a string value associated therewith, and containing no value when said attributes do not have a string value associated therewith; and
   a third column identifying a numeric value when said attributes have a numeric value associated therewith, and containing no value when said attributes do not have a numeric value associated therewith;
   wherein the attribute value column is one of the second column and the third column.

9. The method of claim 8, wherein said third table further comprises:
   a fourth column identifying a language when said attributes have a language value associated therewith, and containing no value when said attributes do not have a language value associated therewith.

10. The method of claim 1, further comprising:
    storing in a metadata table, metadata defining at least one attribute tree that identifies a relationship between said items and said sub-items.

11. The method of claim 10, wherein said metadata identifies, for each sub-items, the attribute tree for said sub-item and a level within said attribute tree.

12. The method of claim 10, further comprising:
    identifying at least said first attribute as a key attribute; and
    storing in said metadata table an indication that said first attribute is a key attribute.

13. The method of claim 1, further comprising:
storing in the single attribute identification column of the second table an item attribute identification associated with the first item, the item attribute identification identifying an item property of the first item and being applicable to both the first and second sub-items; and
storing an item attribute value for the item attribute identification in a row of the attribute value column.

14. The method of claim 13, further comprising
receiving a search request from a user;
in response to the search request, returning results including the first item, first sub-item, and second sub-item; and
displaying search results in a results table, the results table including
an item column, a second column for the item attribute identification and item attribute value, and a third column for the first and second attribute identification, and
a first row for the first sub-item and a second row for the second sub-item, the first attribute value stored in the first row of the third column, and the second attribute value stored in the second row of the third column.

15. A computing system for use in storing data relating to a particular item in an electronic catalog that is described by a set of attributes including at least one attribute that has at least two alternative values used to describe the same particular item, comprising:
a server operable to store an electronic catalog, said electronic catalog comprising:
a first table storing at least a first item and at least first and second sub-items associated with said first item, said first item being an item in an electronic catalog and said first and second sub-items corresponding to alternative information for the same attributes of said first item;
a second table storing in a single attribute identification column at least a first and a second attribute identification associated with said first item, said first attribute identification identifying a property of said first and second sub-items and being repeated for each of said first and second sub-items in respective rows of the single attribute identification column, and said second attribute identification identifying a second property of both said first and second sub-items; and
a third table storing at least first and second attribute values for said first attribute identification in respective rows of an attribute value column, said first and second attribute values associated with said first and second sub-items, respectively, and being alternative values of said property identified by said first attribute identification for said first and second sub-items, respectively;
wherein the first and second attribute identifications are unique identifiers and said electronic catalog does not employ a foreign key.

16. The computing system, as claimed in claim 15, wherein said server is further operable to receive a search request from a user, and in response to said search request return said first item and said attributed values associated with said first item.

17. The computing system, as claimed in claim 16, wherein said server is further operable to receive a second search request from the user, the second search request identifying at least said first attribute identification and said first attribute value; and said server, in response thereto, is operable to search said electronic catalog for items having said first attribute identification and an attribute value associated therewith that is equivalent to said first attribute value.

18. The computing system, as claimed in claim 15, wherein said server is further operable to receive input from a user to add a new item to said electronic catalog and, in response thereto, add at least one row to said first table associated with said new item.

19. A computer data repository for use in storing data relating to a particular item in an electronic catalog that is described by a set of attributes including at least one attribute that has at least two alternative values used to describe the same particular item, comprising:
a first table storing at least a first item and at least first and second sub-items associated with said first item, said first item being an item in an electronic catalog and said first and second sub-items corresponding to alternative information for the same attributes of said first item;
a second table storing in a single attribute identification column at least a first and a second attribute identification associated with said first item, said first attribute identification identifying a property of said first and second sub-items and being repeated for each of said first and second sub-items in respective rows of the single attribute identification column, and said second attribute identification identifying a second property of both said first and second sub-items; and
a third table storing at least first and second attribute values for said first attribute identification in respective rows of an attribute value column, said first and second attribute values associated with said first and second sub-items, respectively, and being alternative values of said property identified by said first attribute identification for said first and second sub-items, respectively;
wherein the first and second attribute identifications are unique identifiers and said tables do not employ foreign keys.

20. The computer data repository, as claimed in claim 19, wherein the second attribute identification is repeated for each of said first and second sub-items in respective rows of the single attribute identification column, wherein said first and second attribute identifications are stored in separate rows of the single attribute identification column in said second table.

21. The computer data repository of claim 20, wherein third and fourth attribute values are associated with said second attribute identification, said third and fourth attribute values associated with said first and second sub-items, respectively, and being alternative values of said second property identified by said second attribute identification for said first and second sub-items, respectively.

22. The computer data repository of claim 19, further comprising a metadata table storing metadata defining at least one attribute tree that identifies a relationship between said items and said sub-items.

23. A computer readable medium including a set of instructions stored thereon that, when executed by a computer, cause the computer to perform a method for use in storing data relating to an item that is described by a set of attributes including at least one attribute that has at least two alternative values used to describe the same particular item, the method comprising:
storing, in a first table, data identifying at least a first item and at least first and second sub-items associated with said first item, said first item being an item in an electronic catalog and said first and second sub-items corresponding to alternative information for the same attributes of said first item;

storing, in a single attribute identification column of a second table, at least a first and a second attribute identification associated with said first item, said first and second attribute identification each identifying a property of said first and second sub-items and being repeated for each of said first and second sub-items in respective rows of the single attribute identification column; and storing at least first and second attribute values for said first attribute identification in respective rows of an attribute value column within one of the second table and a third table, said first and second attribute values associated with said first and second sub-items, respectively, and being alternative values of said property identified by said first attribute identification for said first and second sub-items, respectively;

wherein the first and second attribute identifications are unique identifiers and said steps of storing do not make use of a foreign key.

24. The set of instructions, as claimed in claim 23, wherein the method further comprises:
firstly adding a second item to said first table; and
secondly adding, in response to said firstly adding, at least one new attribute identification to said second table, said new attribute identification associated with said second item.

25. The set of instructions, as claimed in claim 23, wherein the method further comprises:
adding a third sub-item to said first table, said third sub-item associated with said first item;
adding a first new attribute identification to said second table for said third sub-item; and
adding at least one new attribute value associated with the first new attribute identification.

26. The set of instructions, as claimed in claim 23, wherein the instructions are provided to the computer by a data communication network that is operably interconnected with the computer.

* * * * *